United States Patent [19]

Takiguchi

[11] 3,781,750

[45] Dec. 25, 1973

[54] GALVANO-MAGNETRO EFFECT DEVICE

[75] Inventor: Hisashi Takiguchi, Tokyo, Japan

[73] Assignee: Denki Onkyo Co., Ltd., Tokyo, Japan

[22] Filed: Mar. 22, 1973

[21] Appl. No.: 343,954

[52] U.S. Cl. .............. 338/32 R, 338/32 H, 338/329

[51] Int. Cl. .............. H01c 7/16

[58] Field of Search .............. 338/32 R, 32 H, 315, 338/316, 321–325, 327–329; 323/94 H; 324/45, 46; 29/589

[56] References Cited

UNITED STATES PATENTS

| | | | |
|---|---|---|---|
| 3,381,081 | 4/1968 | Schalliol | 338/329 X |
| 2,634,322 | 4/1953 | Law | 29/589 X |
| 2,019,457 | 10/1935 | Lodge | 338/329 X |

*Primary Examiner*—C. L. Albritton
*Attorney*—James E. Armstrong et al.

[57] ABSTRACT

A galvano-magnetro effect device in which the lead frames respectively comprised of a member part meandering alternately in opposite directions which is positioned between the coupling end to be connected to the electrode and the connecting end to be connected are connected to the electrodes of the semiconductor elements.

9 Claims, 8 Drawing Figures

GALVANO-MAGNETRO EFFECT DEVICE

BACKGROUND OF THE INVENTION

The present invention relates to a galvano-magnetro effect device to be employed as a magnetro-resistance effect device or Hall effect device.

Recently, the apparatuses employing the galvano-magnetro effect device (hereinafter referred to as the "device") tend to be compact more and more. Therefore, the lead frame of the device has been required to be reduced in length. However, if the lead frame is short, the heat when soldering the lead frame to the circuit of the apparatus is prone to be conducted through the lead frame. Accordingly, the heat is conducted to a jointed portion of the semiconductor element and lead frame and therefore this jointed portion may be disconnected and the semiconductor element will deteriorate due to heat. When the element is built in an equipment, a mechanical force such as, for example, flexure, twist or shock may be directly conducted to the semiconductor element, and the jointed portion of the semiconductor element and the lead frame and the semiconductor itself may be damaged. Since the tensile stress due to thermal contraction after the lead frames have been attached to the circuit is applied to the jointed portion or the semiconductor element, these parts may be damaged as described above.

Conventionally, in view of the mechanical problems as described above, the device is employed which has lead frames 103 which are coupled to electrodes 102 provided at both ends of semiconductor element 101 and are made in the form of a bent strip. In case of the device like this, said mechanical problem cannot be completely resolved, especially the problem with respect to the mechanical force in the cross direction of the plate surface cannot be resolved. The device is not given any considerations for thermal influence.

For the purpose of resolution of said problem, the device as shown in FIG. 8 was disclosed in the U.S. patent application Ser. No. 183,007 as of Sept. 23, 1971.

Lead frame 103' of this device is formed in the shape of strip having one end as coupling end **103*a* to be jointed with electrode 102 of semiconductor element 101 and the other end as connecting end 103*b* to be connected to the circuit between which wide reinforcing part 103*c* having slot 103*e* is formed intregral with narrow neck parts 103*d* and 103*d'***. In case of this device, the heat is radiated by the slot and heat conduction is prevented by the neck parts and therefore thermal effect when welding the lead frames to the circuit can be eliminated to a certain extent. However, this construction is not satisfactory and said problem resulting from the mechanical stress when the device is built in the equipment is not resolved.

The present invention is intended to improve the device according to said patent application and to resolve said problems.

SUMMARY

The present invention provides a galvano-magnetro effect device in which lead frames respectively having one end as the connecting end to be connected to the circuit and the other end as the coupling end to an electrode of the semiconductor element between which a meander part which is formed so that it has a continuous flat surface which meanders alternately in opposite directions intersecting at a right angle to the direction of thickness, that is, thicknesswise direction is provided, are jointed with a semiconductor element such as, for example, a magnetro-resistance effect element or Hall effect element provided with electrodes formed by coating with a conducting material such as indium at terminal ends so that the coupling end of said lead frame is connected to said electrode.

BRIEF DESCRIPTION OF THE DRAWINGS

The present invention is illustrated in detail by the accompanying drawings whereon.

DETAILED DESCRIPTION OF THE INVENTION

Figure 1:
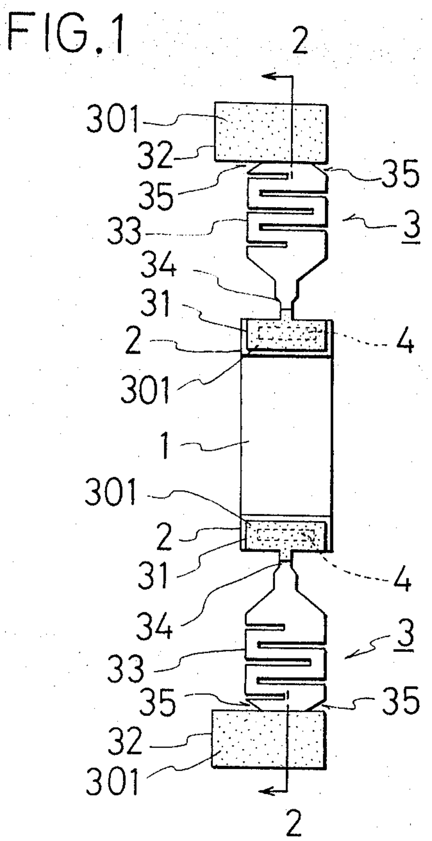
FIG. 1 is a plan view of the device in accordance with the present invention.
Figure 2:
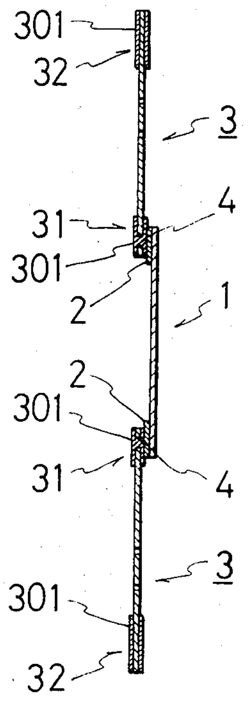
FIG. 2 is a cross sectional side view as seen along line 2—2 shown in FIG. 1, FIGS. 3 to 5 are respectively a plan view showing another embodiment of the device in accordance with the present invention.

Referring to FIG. 1, there is shown a device in accordance with the present invention comprising magnetro-resistance effect element 1 as a semiconductor element which is provided with electrodes 2 formed by coating a thermally fusible conductive material onto both terminal ends through vacuum evaporation and conductive lead frames 3 jointed respectively with said electrodes.

Lead frame 3 is made of a thin plate and is provided with coupling end 31 to be coupled to electrode 2 and connecting end 32 to be connected to the circuit which respectively have conductive layer 301 formed by coating a thermally fusible conductive material thereon.

Meander part 33 is provided between coupling end 31 and connecting end 32 of said lead frame, and said meander part is jointed with said coupling end by narrow neck part 34 and is directly jointed with said connecting end. The jointed portion of the connecting end and the meander part is provided with notches 35.

Said meander part is formed so that it has a continuous flat surface which meanders alternately in opposite directions intersecting at a right angle to the direction of thickness, that is, the thicknesswise direction.

Said neck part is formed to be narrower with steps from meander part 33 to coupling end 31.

The coupling end of said lead frame is provided with through hole 4 at the center which is filled with a thermally fusible conductive material such as a solder which welds said electrode and said conductive layer of the coupling end.

Figure 3:
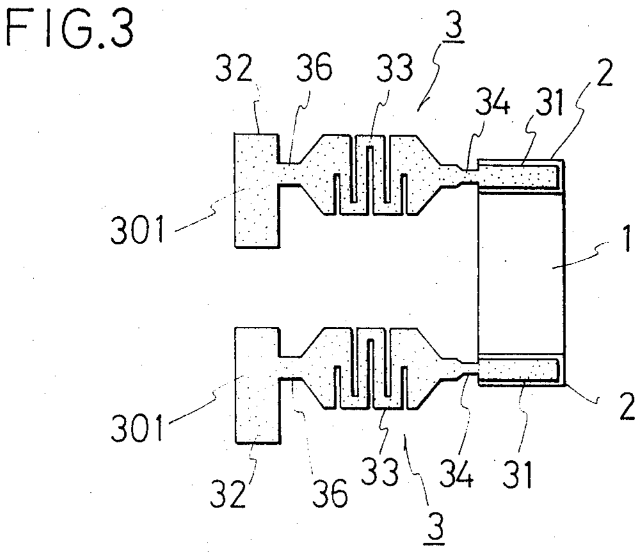

The coupling direction of said lead frame can be freely selected. The lead frame can be connected in series with the element as shown in FIG. 1 and can be connected in parallel as shown in FIG. 3. As shown in FIG. 3, through hole 4 need not be provided at the coupling end, and the conductive layers of the coupling end and connecting end can be formed by coating the entire surface of the lead frame, not by individually coating.

The lead frame can be provided with narrow neck part 34 between the meander part and the coupling end and, moreover, can also be provided with narrow neck part 36 between the meander part and the connecting end as shown in FIG. 3.

Figure 4:
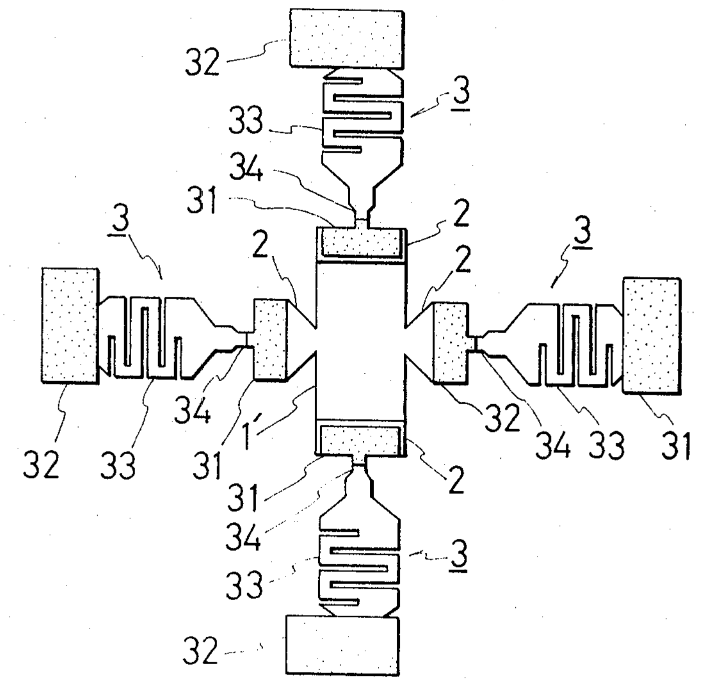
Figure 5:
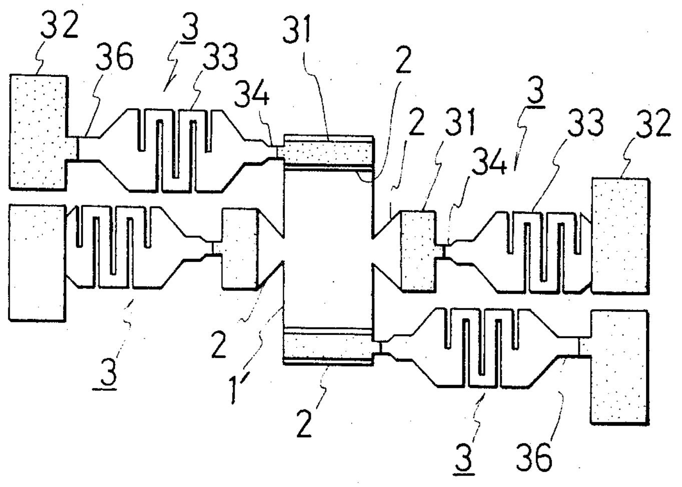

The semiconductor element can be Hall effect element 1' as shown in FIGS. 4 and 5, not the magnetro-resistance effect element. Hall effect element 1' is provided with four electrodes to each of which a lead frame is attached. As in case of the magnetro-resistance effect element, the coupling direction of the lead frame is freely selected; for example, adjacent lead frames can be coupled to the Hall effect element so that they form a right angle position as shown in FIG. 4 or so that they form a parallel position as shown in FIG. 5.

In addition to a solder, indium or lead can be used as a conductive material to be used for coating said lead frames. The melting point of the conductive material on the lead frame is preferred to be slightly lower than that of the conductive material for the electrode.

Indium is generally used as the conductive material for forming said electrode. It is effective to vacuum evaporate indium and silver at the same time so that the total composition contains 10% of silver for increasing conductivity and welding efficiency.

Figure 6:
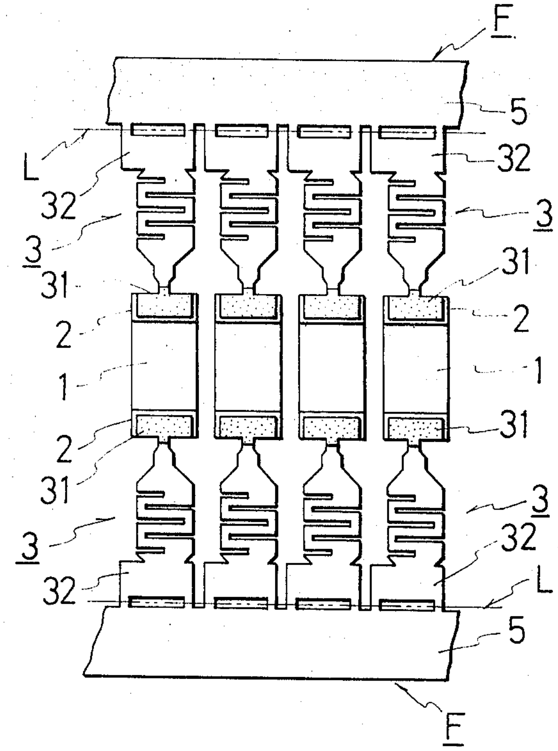
FIG. 6 is a plan view illustrating a producing method to be utilized for the device in accordance with the present invention.
Figure 8:
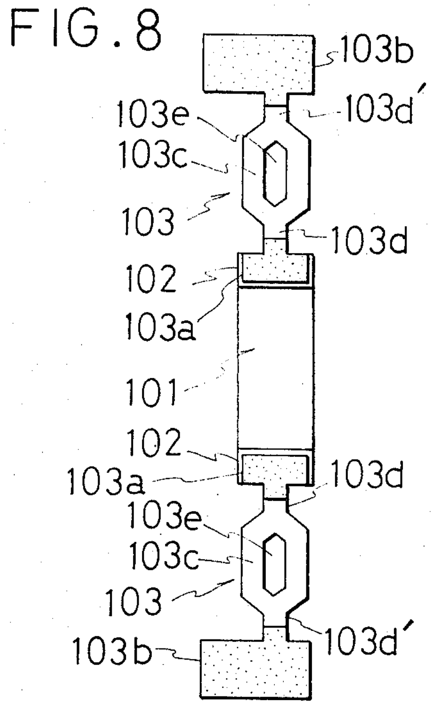
FIG. 8 is a plan view showing another conventional device.
Figure 7:
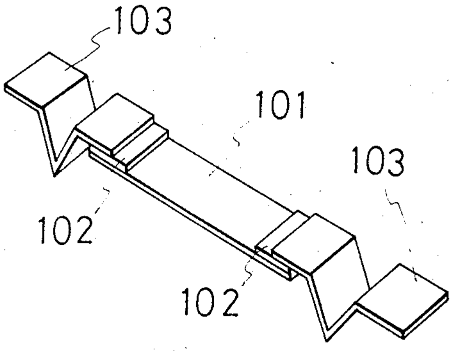
FIG. 7 is an isometric view showing a conventional device.

For making the device as described above, two frame plates F which have many lead frames 3 arranged in parallel with connecting ends 32 formed integral with base plate 5 are opposed as shown in FIG. 6, coupling end 31 which is the free end of each lead frame is overlapped on electrode 2 of semiconductor element 1 and coupling end 31 of the lead frame is externally heated. Thus, the electrode and the coupling end are welded. A number of devices are made merely by cutting connecting ends 32 of the lead frames along cutting line L after welding. A number of devices can be produced in succession by this method. Since the device in accordance with the present invention is as described above, it provides the following advantages.

Since the meander part is provided and the total length of the lead frame between the coupling end and connecting end is far larger than the apparent length, heat radiation efficiency is high. Accordingly, the heat conducted throughout the connecting end is rarely conducted up to the coupling end when the connecting end is to be welded to the circuit and therefore the jointed portion of the coupling end and the electrode of the semiconductor is not melted and the semiconductor does not deteriorate due to prevention of thermal effect.

Since the meander part can absorb external forces such as bending stress, twist stress, tensile stress and contraction stress in all directions, the force applied to the lead frame when the device is built in the equipment is not directly conducted to the jointed portion of the electrode of the semi-conductor element and the coupling end of the lead frame. Accordingly, this jointed portion is not damaged and the semiconductor element is also not damaged. Since the tensile stress applied to the lead frame due to thermal contraction after welding the connecting end to the circuit can be absorbed, the jointed portion and the semiconductor element can be protected from damage.

When a neck part is provided, heat conduction is prevented more effectively and therefore the heat preventive effect described above can be vastly increased.

What is claimed is:

1. A galvano-magnetro effect device comprising a. a semiconductor element provided with electrodes which are formed at terminal ends by coating with a conductive material, and b. conductive lead frames, each having one end as the coupling end to be coupled to the electrode and the other end as the connect-ing end to be connected to a circuit between which a meander part is formed so that it has a continuous flat surface which meanders alternately in opposite directions, wherein said coupling end of said lead frame is welded onto said electrode.

2. A galvano-magnetro effect device in accordance with claim 1, wherein a narrow neck part is provided between said coupling end of the lead frame and said meander part.

3. A galvano-magnetro effect device in accordance with claim 1, wherein a narrow neck part is provided between said connecting end of the lead frame and said meander part.

4. A galvano-magnetro effect device in accordance with claim 1, wherein a through hole is provided in said coupling end of the lead frame.

5. A galvano-magnetro effect device in accordance with claim 1, wherein said coupling end of the lead frame is coated with a thermally fusible conductive material which is welded with a conductive material forming said electrodes.

6. A galvano-magnetro effect device in accordance with claim 5, wherein a through hole provided in said coupling end of the lead frame is filled with a thermally fusible conductive material which can be welded with a conductive material on said coupling end and a conductive material of said electrode.

7. A galvano-magnetro effect device in accordance with claim 1, wherein said connecting end of the lead frame is coated with a thermally fusible conductive material.

8. A galvano-magnetro effect device in accordance with claim 1, wherein said semiconductor element is a magnetro-resistance effect element.

9. A galvano-magnetro effect device in accordance with claim 1, wherein said semiconductor element is a Hall effect element.

* * * * *